April 26, 1932.  H. T. COLLING ET AL  1,855,906
CHEESE CUTTER
Filed Nov. 23, 1928   2 Sheets-Sheet 1

INVENTORS
HARRY T COLLING AND
BY  JACOB R STEWART
ATTORNEY.

April 26, 1932.  H. T. COLLING ET AL  1,855,906
CHEESE CUTTER
Filed Nov. 23, 1928  2 Sheets-Sheet 2

INVENTORS.
HARRY T COLLING AND
JACOB R STEWART
BY
ATTORNEY.

Patented Apr. 26, 1932

1,855,906

UNITED STATES PATENT OFFICE

HARRY T. COLLING AND JACOB R. STEWART, OF CINCINNATI, OHIO, ASSIGNORS TO THE ECONOMY MANUFACTURERS COMPANY, OF CINCINNATI, OHIO, A CORPORATION OF OHIO

CHEESE CUTTER

Application filed November 23, 1928. Serial No. 321,339.

The invention relates to manually operative means for slicing cheese.

Heretofore, persons, such as store keepers, have experienced considerable difficulty, inconvenience, and wasted time in cutting cheese by utilization of the usual manually operated knife, or cutting device employing a knife, because since certain kinds of cheese are soft and sticky, the knife-blade readily adheres to the cheese, whereby the manual or mechanical power required to force the blade through the cheese distorts the formation and often it is necessary for the person cutting the cheese to pull the slices from adherence with the knife blade. In other instances, the cheese is hard and brittle and forcing a knife-blade through the cheese frequently breaks a thin slice of the cheese before the cut is completed.

Therefore, the objects of the invention are to provide a simple, efficient, and practical cheese cutting device; to provide a cheese cutting device having, as cutting means, a wire which is unadapted to require frequent replacements or resharpening; to provide means whereby a plurality of slices of the cheese, from any formation, as brick, rolls, and spheres, may be quickly and conveniently cut and automatically stacked in a pile adjacent said device without necessity of the operator touching said cheese; to provide manually adjustable means adapted to regulate the thickness of the slices of cheese cut by utilization of said device from the formation of the cheese; and to provide means whereby said cheese is automatically maintained immovable on said device during a cutting operation.

Other objects are apparent by reference to the hereinafter description and the drawings.

The invention consists in the combination of the parts, arrangement of the various elements, and in the details of the construction, as claimed.

Figures 1, 4:
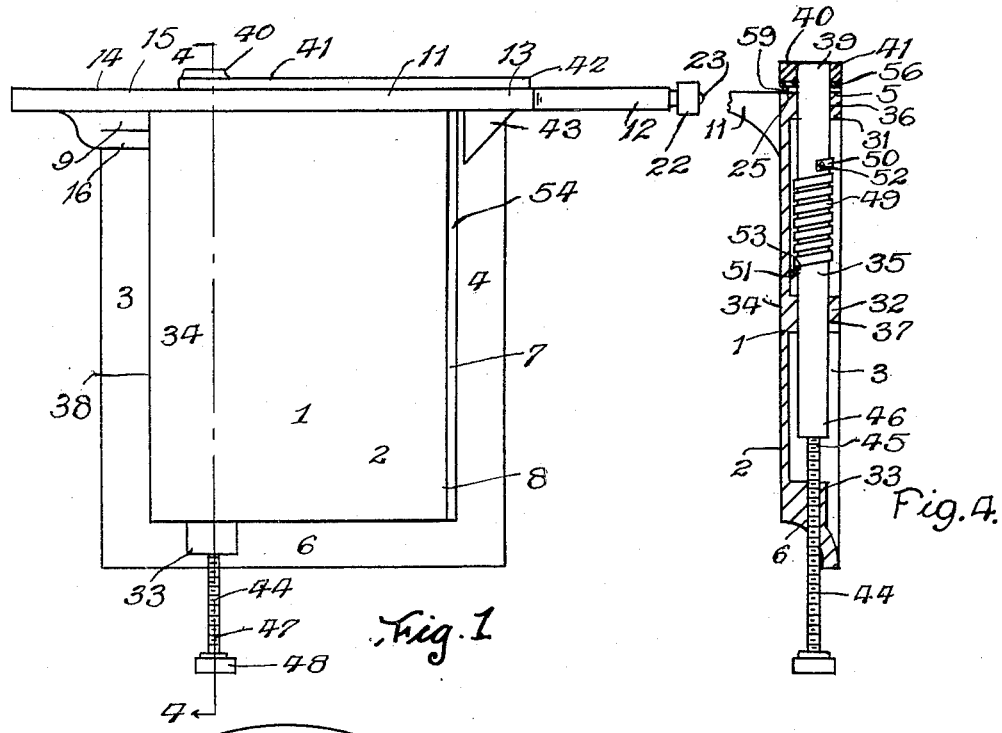
Fig. 1 is a plan view of the invention showing the nut 48 in position during assembly of the invention.
Fig. 4 is a section taken on a line corresponding to 4—4 in Fig. 1.

In the preferred construction of the invention, we provide the rectangular base 1 comprising the integrally formed top 2, sides 3 and 4 and the ends 5 and 6. The sides 3 and 4 and the end 6 are curved outwardly, whereas the end 5 is perpendicular to the top 2.

Integrally formed with the top 2 is the flange 7 which extends upwardly therefrom and has its inner side 8 substantially at right angles to the top. The flange 7 extends parallel with and adjacent to the transverse edge 8 of the top and the full width thereof.

Integrally formed with the side 3 of the base, and adjacent the end 5, is the upwardly extending boss 9 having the hole 10 therein.

Pivotally connected with the boss 9 is the U-shape holder-lever 11 having the hand contact handle 12 integrally formed with its end 13. The end 14 of the lever 11 is formed with the spaced apart bosses 15 and 16 having the holes 18 and 17, respectively, therein. The boss 9 is positioned intermediate the bosses 15 and 16 and pivotally connected therewith as by the bolt 19 which is received through the holes 10, 18, and 17, respectively, in the bosses 9, 16, and 15.

Integrally formed with the lower end 13 of the lever 11 and the handle 12, respectively, are the downwardly extending parallel and spaced apart lugs 20 and 20'.

Threaded in the lug 20' is the bolt 21 having the thumb nut 22 threaded to its outer end 23, whereby the bolt is maintained in stationary relation with the lug 20'. The end 24 of the wire or cutter 25 is secured to the bolt 21.

The other end 26 of the wire 25 is fixed to the screw 27 threaded to the boss 9. The wire 25 is drawn taut over the lower edge 28 of the lug 20, (and is received in the groove 29 in the lower edge of the lug 20), as by manually screwing the thumb nut 22, whereby the wire is capable of being used as a cutter, for purposes fully explained hereinafter.

Integral with the lower surface 30 of the top 2 are the spaced apart and aligned bosses 31 and 32 and 33 adjacent the side 3 of the base. The bosses 31, 32, and 33, respectively, are adjacent the end 5, the central portion 34, and the end 6 of the base 1. The shaft 35 is rotatably received in the holes 36 and 37 respectively, in the bosses 31 and 32 and extends parallel with the edge 38 of the top 2.

Figure 5:
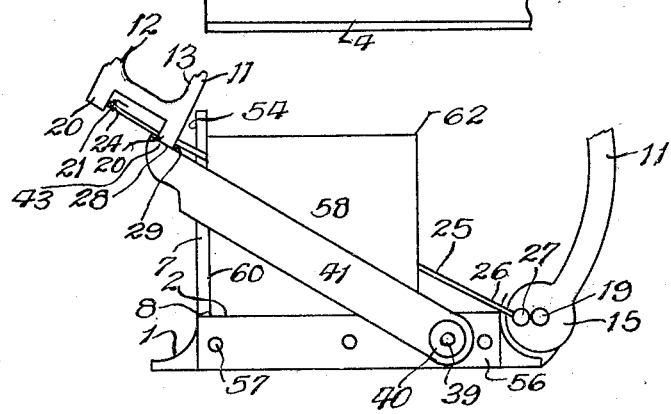
Fig. 5 is an end elevation of the invention shown partly broken away.
Figure 6:
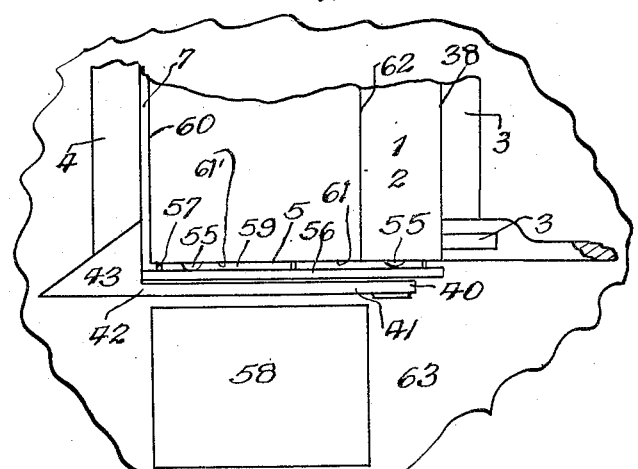
Fig. 6 is a plan view of the same.

Fixed to the outer protruding end 39 of the shaft 35 is the end 40 of the stop lever or gauge 41 having integral with its other end 42 the enlarged portion 43 extending beyond the flange 7. The enlarged portion 43 is adapted to be contacted by the lower end of the lug 20 when the lever 11 is in downward position as shown in Fig. 1. Also, as shown in Fig. 5 the lug 20 is adapted to contact the enlarged portion 43 when the lever 11 is partly elevated.

The screw 44 is slidably received in the boss 33 and has its inner end 45 threaded in the end 46 of the shaft 35 and fixed thereto. Threaded to the outer end 47 of the screw 44 is the thumb nut 48. Positioned around the shaft, intermediate the bosses 31 and 32, is the coiled spring 49 having its ends 50 and 51, respectively, fixed by the screws 52 and 53, to the shaft and the top 2, whereby the end 42 of the gauge 41 is urged upwardly with the enlarged portion 43 in contact with the outer side 54 of the flange 7, when downward pressure is released from the end 42 of the gauge 41, as by manually elevating the end 13 of the lever 11. The spring is in tension for the purpose of normally urging the shaft 35 from the boss 33. As illustrated in Fig. 4, when the invention is being assembled, the shaft 35 is positioned with the gauge 41 relatively close to the end 5 of the base 1, after which the nut 48 should be screwed on the screw 44 until it contacts the outer end of the boss 33. Afterward manually screwing of the nut 48 on the screw 44 in one direction forces the shaft 35 and the gauge 41 inwardly, and screwing the nut 48 in an opposite direction permits the spring 49 to urge the shaft 35 outwardly of the base 1 whereby the gauge 41 is spaced from the end 5 of the base.

Integral with the outer surface of the end 5 are the projections 55 adapted to space the plate 56 from the end 5. The plate 56 is secured to the end 5 as by the screws 57, whereby when the lever 11 is in downward position, after cutting a slice 58 from the block 58' of the cheese, the wire or cutter 25 is received in the space 59 between the plate 56 and the end 5 of the base 1.

Figures 2, 9:
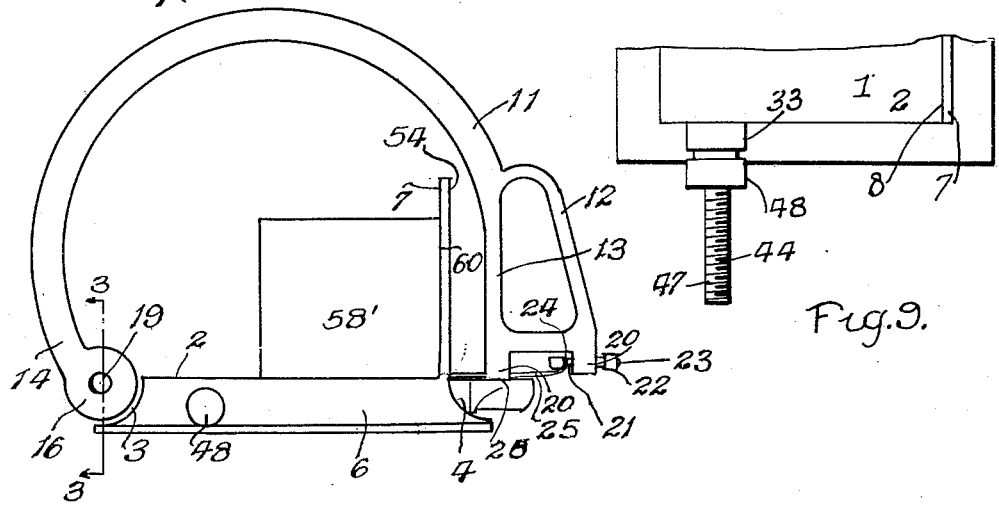
Fig. 2 is an end elevation of the invention showing a brick of cheese thereon.
Fig. 9 is a plan view of the assembled invention showing the nut 48 in contact with the boss 33.
Figure 3:
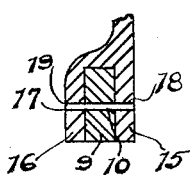
Fig. 3 is a section taken on a line corresponding to 3—3 in Fig. 2.
Figure 7:
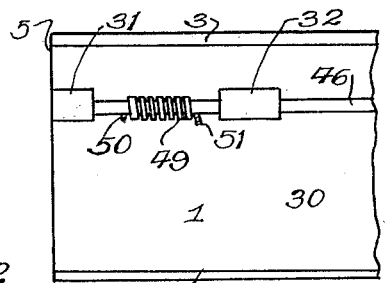
Fig. 7 is a bottom view of the base with parts broken away.

In operation the thumb nut 48 is manually screwed in contact with the outer end of the boss 33 and then screwed inwardly or outwardly to cause the gauge 41 to move inwardly or outwardly from the end 5 of the base to a position dependent upon the desired thickness of the slice of the cheese to be cut. The thumb nut 48 is shown in contact with the outer end of the boss 33 in Fig. 9. Then the block 58' of the cheese is positioned upon the base 1 with its side 60 in contact with the inner side 8 of the flange 7. Then the handle 12 is pulled upwardly until the wire 25 is spaced a sufficient distance from the top 2 of the base to permit the brick 58' to be manually moved, while its side 60 is contacting the flange 7, over the space 59 and with its end 61 in contact with the gauge 41. Then the handle 12 is manually forced downwardly whereby the wire 25 is caused to enter the corner 62 of the brick 58', as shown in Fig. 5. Further downward movement of the handle 12 forces the wire 25 through the brick.

When the wire has passed partly through the brick the space 59 receives the wire and the lower end 28 of the lug 20 engages the upper surface of the end 42 of the gauge 41, whereby the end 42 of the gauge is forced downwardly. When a slice is cut from the brick 58', the slice falls upon the support 63 of the base 1. Then the handle 12 is moved upwardly to the cutting position, and the gauge 41 is automatically urged upwardly by the spring 49, whereby the brick 58' is ready to be manually slid with its end 61 in contact with the gauge. Successive operations, as described, effect cutting of a plurality of slices 58, of the cheese, which fall in a stack beside the base 1.

Figure 8:
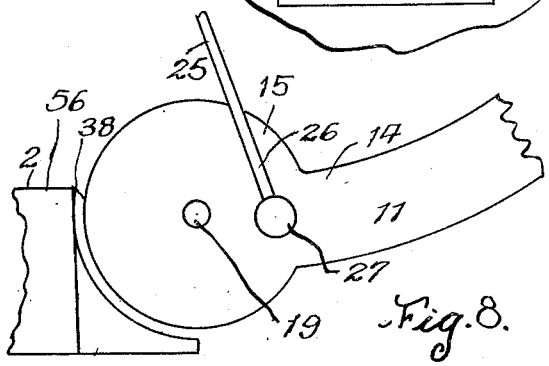
Fig. 8 is an end elevation of the invention showing a modification of the same.

In Fig. 8 is shown a modification of the invention having the end 26 of the cutter 25 secured to the screw 27 which is positioned upwardly of the pivot bolt 19, in the bosses 9, 15, and 16, whereby downward movement of the lever 11 causes the wire 25 to simultaneously move downwardly and transversely of the base, thereby facilitating in a slice being cut from the brick 58'.

An advantage of the invention is that any formation of cheese large and small may be sliced. Also, the device is extremely simple to operate and economical to manufacture.

Another advantage is that, after a little practice in operating the invention, the operator may quickly slice cheese, the slices of which are of equal or unequal thickness, as desired and regulated by manual operation of the thumb nut 48.

It is, therefore, quite apparent that we have invented a highly desirable, efficient, and economical cutting device for the purposes intended and which is especially adaptable for convenient use of persons who retail cheese. It is, also, apparent that the device will render satisfactory service for a long period without the necessity of repairs or replacing the parts.

While we believe that the forms of the invention illustrated in the drawings and referred to in the above description, as the preferred embodiment, are the most efficient and practicable, yet realizing that the conditions concurrent with the adoption of the device will necessarily vary, we desire to emphasize the fast that changes in the details may be resorted to, when required, without sacrificing any of the advantages of the invention, as defined in the claims.

What we claim as new and desire to secure by Letters Patent is:

1. A cheese cutter comprising a horizontal base for supporting cheese, a cutter having one end pivotally mounted on said base, a rotatable shaft mounted on said base, a gauge mounted on said shaft, means on said shaft to normally urge one end of said gauge upward, and manually operative means to adjust said gauge with relation to the path of said cutter whereby the thickness of the slices cut from said cheese is varied.

2. In a device of the class described, a base for supporting cheese, a shaft rotatably mounted on said base, a gauge fixed to said shaft, a cutter pivotally connected with said base, a plate intermediate said gauge and said base, said cutter adapted to cooperate with the space between said plate and said base when said cutter is moved downwardly for slicing said cheese, resilient means adapted to normally urge an end of said gauge upwardly, manually operative means adapted to vary the distance between said gauge and said plate thereby controlling the thickness of the slices cut from said cheese by said cutter when said cheese, supported by said base, is positioned in contact with said gauge and said cutter is forced downwardly.

3. A cheese cutter comprising a base to support cheese, a gauge against which the end of the cheese to be cut is positioned, said gauge having one end pivoted to said base, means to normally urge the other end of said gauge upwardly adjacent said end of said cheese, a cutter adapted to be moved downwardly to slice said end of said cheese, said cutter adapted to force an end of said gauge downwardly and below said cheese during the cutting operation whereby the cut slices are adapted to fall from said base and manually operative means to adjust said gauge.

4. A cheese cutting device comprising a base adapted to support cheese, a vertical flange adjacent one side of said base, a gauge having one end free and having one end pivotally connected adjacent to the opposite side of said base, said gauge being positioned adjacent an edge of said base and adapted to be contacted by said cheese, means to normally urge the free end of said gauge upwardly in contact with said flange, a cutter having a free end and having one end pivoted to said base, said free end being arranged to contact said gauge, slice said cheese and force said free end of said gauge downwardly when the free end of said cutter is manually forced downwardly, and means to adjust said gauge inwardly and outwardly of said base whereby the thickness of slices cut by said cutter from said cheese is varied.

5. A cheese cutting device comprising a base to support cheese, a gauge having one end free and having one end movably connected with said base, said gauge adapted to be contacted by said cheese, means to normally urge the free end of said gauge upwardly, a cutter lever having one end pivoted to said base, said cutter lever adapted to slice said cheese and force said free end of said gauge downwardly when said cutting lever is manually forced downwardly, and means to adjust said gauge inwardly and outwardly of the plane of said lever thereby regulating the thickness of slices cut by said lever from said cheese when said cheese is supported by said base and positioned in contact with said gauge.

6. The combination with a base for supporting cheese, a cutter pivoted to said base and adapted to be manually operated adjacent an end of said base for cutting cheese, of a gauge having one end pivoted to said end of said base, means to urge the other end of said gauge upwardly in a plane parallel with the plane through which said cutter moves, said cheese adapted to contact said gauge, and manually operative means to adjust said gauge toward and from said plane of said cutter.

HARRY T. COLLING.
JACOB R. STEWART.